Feb. 8, 1966  C. E. SODERBERG  3,233,417
AUGER ICE MAKER WITH CLEANOUT SYSTEM
Filed Nov. 12, 1963
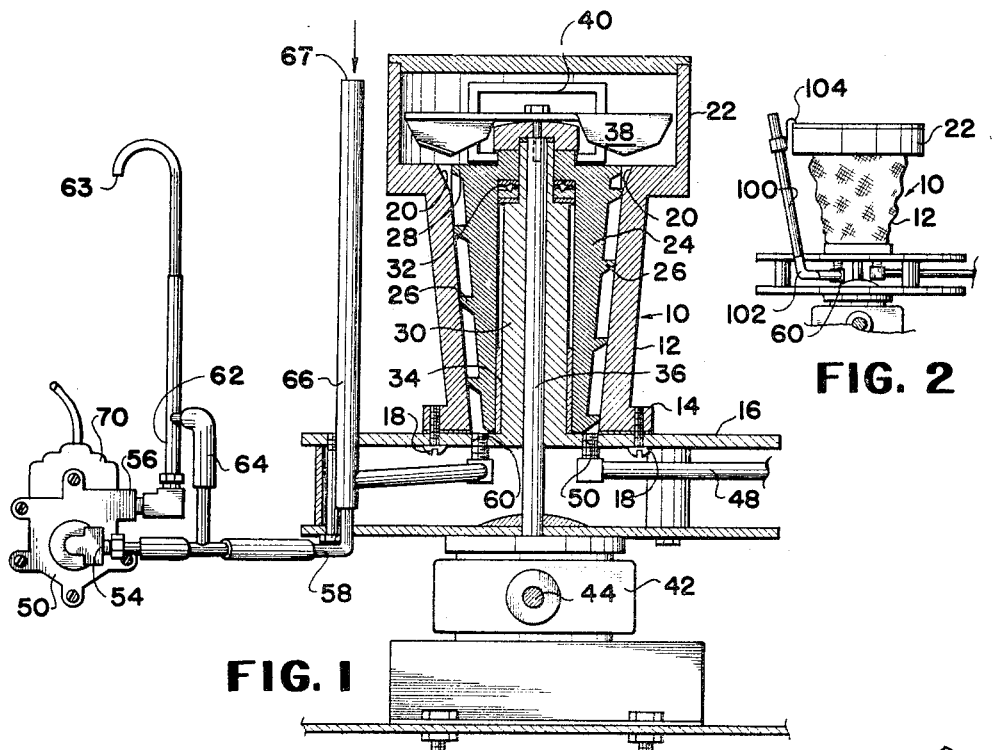
FIG. 1
FIG. 2
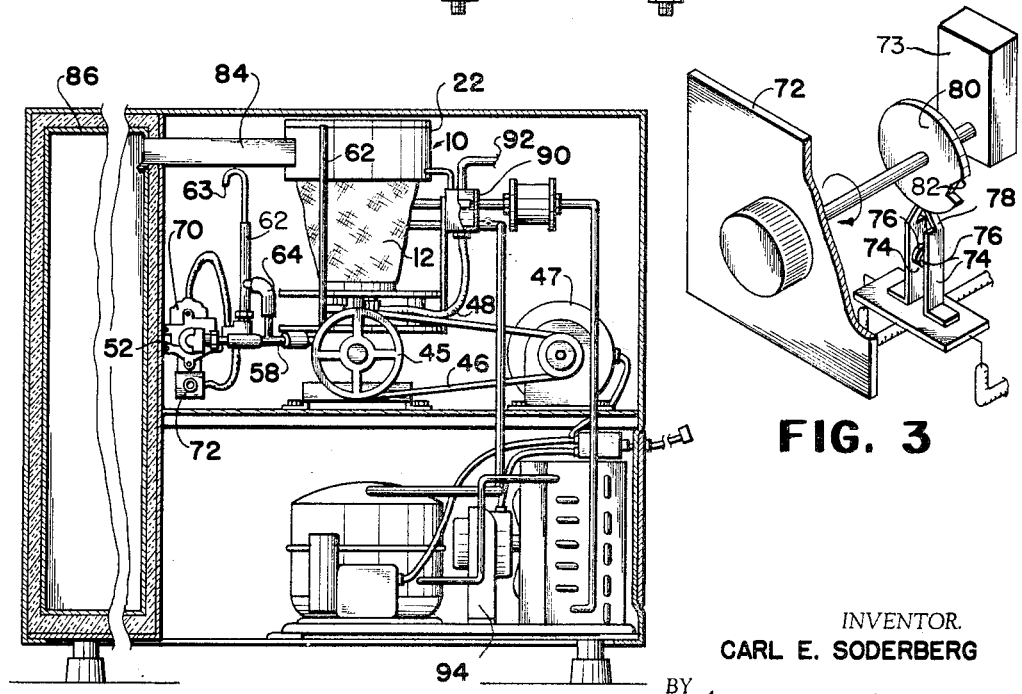
FIG. 3
FIG. 4
INVENTOR.
CARL E. SODERBERG
BY
John H. Widdowson
ATTORNEY United States Patent Office 3,233,417
Patented Feb. 8, 1966

1

3,233,417
AUGER ICE MAKER WITH CLEANOUT SYSTEM
Carl E. Soderberg, 707 N. Main, Wichita, Kans.
Filed Nov. 12, 1963, Ser. No. 322,830
3 Claims. (Cl. 62—233)

This invention relates to freezing liquids. More specifically this invention relates to apparatus adapted to freeze liquids to produce small ice particles and/or chips. Still more specifically this invention relates to a cleanout means for the freezing chamber of an apparatus to produce ice particles and/or chips. The invention relates to a cleanout system particularly adapted for ice producing apparatus that exerts a high pressure on the ice product as it is expelled from the freezer chamber, which cleanout system is adapted to remove liquid and residue.

Apparatus that continuously freezes water or other liquids in a freezing chamber and then continuously scrapes the ice or other frozen material so formed from the freezer chamber and removes same from the chamber is old in the art. It has been noted that this type of freezing apparatus, when operating continuously over periods of time, becomes progressively less efficient in operation. The frozen product becomes more soft and mushy and in some instances may take on a bitter unpleasant taste. Further the operating temperature necessary to freeze the liquid is often lowered causing operating difficulties and inefficiency.

My co-pending application entitled Ice Making Machine, Serial No. 225,622, filed September 24, 1962, is an improvement on this general type of apparatus. In my co-pending application there is disclosed a novel freezing apparatus wherein a pressure is exerted on the ice formed in the chamber by expelling it through a constricted opening. The pressure exerted on the ice particles depresses their melting point thereby lowering the temperature. Upon emerging from the freezing chamber the pressure is relieved and the melting point reverts back to normal. The adherent water is frozen to the ice particles to produce a superior dry crystalline chip type ice. While the freezer apparatus disclosed in my copending application represents a great step forward in the art, it too is subjected to the hitherto unexplained loss of efficiency as the freezer apparatus is operated continuously over prolonged periods of time. I have discovered the underlying reason for the hitherto unexplained loss of efficiency of the freezer apparatus known to the prior art and also to my apparatus disclosed in my co-pending application and have discovered new and novel improvements to such structures which will overcome the problem.

I have invented a new improvement for use in freezing apparatus having a freezing chamber, a means to introduce liquid to be frozen in the freezing chamber, and a means adpted to remove frozen material formed in the freezing chamber. The new improvement is an outlet means in the lower portion of the freezing chamber, and a means to remove liquid and residue from the freezing chamber through the outlet opening.

A preferred specific embodiment of the new improvement for freezing apparatus is a cleanout system for the freezing chamber of the apparatus. This cleanout system has a pump means, a conduit connected at one end to an opening in the freezing chamber and the other end to the inlet of the fluid pump, and a second conduit open at one end and connected at the other end to the outlet of the pump. Preferably the open end of the second conduit is positioned above the liquid level in the freezing

2 chamber. A motor for the pump means is provided and a timing means is used to periodically activate the pump motor to forceably remove the liquid and residue from the freezing chamber. Preferably the timing means includes electrical contact means which are periodically opened and closed by the timing means, which electrical contact means are positioned in the electrical circuit supplying current for the motor driving the pump.

The new improvement of my invention for freezing apparatus solves the problems associated with freezing apparatus of the prior art and also materially improves the efficiency and ice product of the new improved freezer apparatus described in my aforementioned co-pending application.

I have discovered that in a continuously operating freezer apparatus there is a build up of impurities in the water or liquid in the freezing chamber which is responsible for the observed inefficiency and lower ice product quality. The ice that forms in the chamber is usually more pure than the water supply. The constant freezing out of the relatively pure ice particles tends to build up the concentration of the impurities since these remain. The impurities referred to are many and varied depending upon the geographical location and nature of the water supply. In general the impurities consist of dissolved metallic salts, minerals, etc. Ordinarily this concentration process continues in the freezing chamber until the rate at which the impurities are removed by water having impurities therein adhering to the ice leaving the chamber, is equal to the rate that the impurities are introduced into the chamber by the incoming water supply. Ordinarily at this equilibrium state the concentration of the impurities is relatively high. The high concentration reduces the efficiency and lowers the quality of the frozen ice product.

The new improvement of my invention by periodically draining out or pumping out the accumulated impurities is the freezing chamber does away with the cause of the trouble and thus banishes the effects. A freezer apparatus having the new improvement of my invention installed thereon periodically drains the freezing chamber thereby preventing a large build up of impurities in the liquid or water contained in the freezing chamber. My new cleanout improvement for freezing apparatus is simple, dependable in operation, low in cost, and can be installed on existing freezing apparatus.

An object of this invention is to provide new improvements in freezing apparatus.

Another object of this invention is to provide new freezer apparatus combination.

Yet another object of this invention is to provide a new improved cleanout system for freezing apparatus.

An object of this invention is to provide a means in a freezer apparatus to periodically eliminate the build up concentration of impurities in the liquid to be frozen contained in the freezing chamber thereof.

Yet another object of this invention is to provide a new cleanout means for freezer apparatus that is simple, dependable in operation, and low in cost.

Another object of this invention is to provide new cleanout systems for freezing apparatus that can be easily and quickly installed on existing freezing apparatus.

Yet another object of this invention is to provide a new cleanout system particularly adapted for use with freezer apparatus wherein the frozen material produced in the freezing chamber is placed under pressure to lower the melting point thereof, which subsequently results in a dry crystalline chip type ice.

Other objects and advantages of the invention will be apparent to those skilled in the art from disclosures set forth herein. Drawings of preferred specific embodiments of the invention accompany and are a part hereof and such are to be understood to not unduly limit the scope of the invention.

In the drawings,

FIG. 1 is a front elevational view in cross section of a preferred specific embodiment of my new cleanout system shown in combination with the freezing chamber of a freezer apparatus.

FIG. 2 is a front elevational view of another specific embodiment of my invention shown mounted on a freezing apparatus.

FIG. 3 is a fragmentary detail view showing the structure of a preferred specific embodiment of the timing means for use to control the specific embodiment shown in FIG. 1.

FIG. 4 is a front elevational view in partial cross section of a complete freezing apparatus, including an ice storage chamber, and cleanout system improvement of my invention which illustrates a new combination apparatus of my invention.

The following is a discussion and description of new cleanout systems for freezer apparatus, and freezer apparatus combinations of my invention made with reference to the drawings, wherein the same reference numerals are used to indicate the same or similar parts and/or structure. The discussion and description are of preferred specific embodiments of the new cleanout system for the freezing chamber and combinations thereof of my invention, and it is to be understood that such are not to unduly limit the scope of my invention.

In FIGS. 1–4 are shown specific embodiments, detail structures, and combinations of my new invention. In FIG. 1 there is shown a freezer apparatus 10 having a frusto-conical downwardly tapered freezing chamber 12. The freezing chamber 12 is provided with a base flange 14 bolted to a flat base 16 with bolt means 18. The freezing chamber 12 is provided with upwardly flared serrations 20 along the upper inside surface thereof. The freezing chamber 12 is also provided with an upstanding portion 22 jointed to the lower frusto-conical downwardly tapered portion. A tapered auger 24 is rotatably mounted within the freezing chamber 12. Auger 24 is provided with a flight means 26 and an annular top blade flange 28. Blade flange 28 and serrations 20 together form a constricted outlet opening for frozen material formed in freezer chamber 12. It is understood that any suitable type of constricted opening can be provided, or it can be deleted entirely if desired. The auger 24 is shown rotatably mounted on a shaft housing 30 integrally formed on base 16. The auger 24 is supported on shaft housing 30 with a top bearing 32, and a pilot bearing 34 positioned between the shaft housing and the auger adjacent the bottom thereof. A shaft means 36 is rigidly secured to auger 24, and also to a vaned element 38. The vaned element 38 is adapted to force ice formed in the chamber 12, and subsequently forced through the constricted openings, out of opening 40 in the upper portion 22 of freezing chamber 12. A power means is provided to rotate the auger 24. The power means can be any suitable means. As shown in FIGS. 1 and 4, the auger 24 is rotated by shaft 36 which is connected to a gear box 42. A horizontal shaft 44 having pulley 45 mounted thereon is driven by belt 46 and motor 47. A means is provided to introduce liquid to be frozen into said freezer chamber 12. In FIG. 1 is shown a conduit 48 connected to the bottom of freezer chamber 12 through opening 50. A suitable means is provided to maintain the proper level of liquid in the freezing chamber 12. This can be suitably done by a reservoir 90 having a float valve therein, which float valve controls the liquid level in the reservoir and also in the freezing chamber.

The new cleanout system for the freezing chamber of a freezing apparatus has a rotary fluid pump 52 having an inlet 54 and an outlet 56. Any suitable type of pump can be used if desired, as for example a piston or diaphragm type. A first conduit means 58 is connected at one end to an outlet opening 60, located in the bottom of freezer chamber 12, and at the other end to the inlet 54 of the fluid pump 52. If necessary or desirable suitable flexible portions in line 58 can be provided to absorb and/or insulate the vibrations of the fluid pump 52 and the freezer apparatus. A second conduit 62 is connected at one end to the outlet 56 of the fluid pump 52 and has a major portion thereof extending in an upright position. As shown in FIG. 1 the open end 63 of conduit 62 is positioned above the liquid level of the liquid in freezer chamber 12. By positioning the open end 63 of conduit 62 above the liquid level leakage through the pump is prevented. A third conduit means 64 is provided and is connected at one end to first conduit 58 in the intermediate portion thereof and at the other end to the second conduit 62 in the intermediate portion thereof. Conduit 64 provides a suitable means for recirculating a portion of the liquid handled by pump 52 in the event that the capacity of the pump exceeds the rate at which liquid can be drained from the freezing chamber 12. Conduit 64 prevents fluid pump 52 from running dry in the event that the liquid cannot be withdrawn from the freezing chamber at a suitable fast rate. By providing conduit 64 a somewhat larger pump can be provided to withdraw liquid from freezer chamber 12. A fourth conduit 66 having a major portion thereof positioned in an upright position with the open top end 67 disposed at a higher elevation than the liquid level in the freezer chamber is provided. The lower end of conduit 66 is joined to the first conduit 58 at a point between the junction of conduit 64 and 58 and the end connected to outlet 60. The conduit 66 serves as a standpipe to the cleanout system. Conduit 66 serving as a standpipe provides a relief in the event that the conduit 58 or outlet 60 is clogged.

A motor 70 is provided for driving the fluid pump 52. A suitable electrical circuit (not shown) is connected to motor 70 for supplying electrical current thereto. A timing means 72 is also provided for intermittently actuating motor 70. The timing means 72, illustrated in FIG. 3, includes parallel spaced flexible upright elements 74, electrical contact points 76 mounted in opposed relation on the inside facing surfaces of the upright elements 74 and an upwardly bowed member 78 secured to and bridging the ends of the upright elements 74. The electrical contacts 76 are a part of the electrical circuit supplying current to the motor 70. The electrical contacts 76 are adapted to either make or break the electrical circuit of the motor 70. A rotatable circular disc 80 having a notch 82 in the periphery thereof is mounted above the bowed member 78 and contacts it with the peripheral edge. When the peripheral edge of disc 80 contacts the bowed element 78 it forces the bow of the element downwardly thereby opening the contact points 76 breaking the circuit supplying current to motor 70. However, when the bowed element 78 is in engagement with notch 82 in disc 80, the notch allows the bowed element to bow more sharply thereby allowing contact points 76 to contact each other and thereby complete electrical circuit to motor 70 to actuate it. The disc 80 is driven by a suitable drive means 73, shown in FIG. 3. The specific structure of a drive means for a timer is well known in the art and will not be described in detail. The drive means turns the disc 80 slowly which subsequently controls the time that pump 70 will operate to pump the liquid and residue impurities from the bottom of the freezing chamber. The timing means can be constructed to actuate the motor at any suitable interval.

In FIG. 4 is shown my new cleanout system embodied in a complete freezer and storage unit. The freezing apparatus 10 is shown having a chute means 84 connected to outlet 40 in the upper portion of freezer chamber 22 and to an opening in an ice storage chamber 86. A suitable conventional refrigeration unit 94 is shown mounted below the freezer apparatus 10 for supplying refrigerant to the cooling coils mounted about the freezer chamber 12. The refrigeration cycle and mechanism 94 is conventional and is not part of the invention and will therefore not be described. A suitable electrical circuit is provided to correlate the operations of the freezer unit and refrigeration mechanism. Further a sensing unit can be provided to initiate operation of the freezer unit when the supply of ice is depleted to a given level. A heating coil can be provided adjacent the constricted opening of the freezer chamber if desired. This heating coil is desirably a coil supplying liquid refrigerant to the evaporation cooling coils mounted on the lower portion of the freezer chamber 12. A reservoir 90, connected to a source of water or other liquid 92, is connected to conduit 48 and maintains the liquid level in freezer chamber 12.

In FIG. 2 is shown still another specific embodiment of my invention. There is shown a freezer apparatus 10 having a freezer chamber 12 with an auger and the means to drive same similar in structure to the structure shown and described in FIG. 1. The cleanout system provided in the embodiment shown in FIG. 2 consists of a first conduit 100 connected at one end to outlet 60 located in the bottom of freezer chamber 12. The conduit 100 has has a flexible portion 102 positioned adjacent outlet 60. On the top of conduit 100 is provided a hook means 104 adapted to hook over the top portion 22 of freezing chamber 12. As shown in FIG. 2 the end of conduit 100, when mounted in the manner illustrated is positioned well above the liquid level in the freezing chamber. When it is desired to remove the impurities from the interior of the freezing chamber 12 the operator manually unhooks the hook 104 from the top of freezer chamber 12 and bends it downwardly allowing the impurities to escape through conduit 100. If desired a valve or other means can be provided in conduit 100 to control the egress of fluid and residue therefrom.

While I have described and illustrated preferred specific embodiments of my invention, it is to be understood that the improved freezer apparatus and elements thereof disclosed can be made in other forms than described or suggested without departing from the spirit of my invention.

I claim:

1. In an apparatus to manufacture dry frozen crystal particles having a frusto-conical downwardly tapered freezing chamber having an opening in the bottom portion and provided with upwardly flared serrations along the upper inside surface, a tapered auger rotatably disposed within said freezing chamber and provided with flight means and an annular top blade flange which together with said serrations forms a constricted outlet opening, a power means to rotate said auger, a means to introduced liquid to be frozen in said freezer chamber, and a refrigeration means to remove heat from said freezing chamber, the improvement comprised of a cleanout system for the freezing chamber of said apparatus comprising, a rotary fluid pump having an inlet and an outlet, a first conduit means connected at one end to said opening in the bottom of said freezer chamber and at the other end to the inlet of said fluid pump, a second conduit open at one end connected to the outlet of said fluid pump having a major portion thereof extending in an upright position, a third conduit means connected at one end to said first conduit in the intermediate portion thereof and at the other end to said second conduit in the intermediate portion thereof, a fourth conduit joined at one end to said first conduit between the junction of said first and third conduits, and the end connected to said freezer chamber, said fourth conduit having a major portion thereof positioned in an upright position with the opposite open top end disposed at a high elevation than the liquid level in said freezer chamber, a motor driving said fluid pump, an electrical circuit connected to said motor for supplying electrical current to same, a timing means for intermittently actuating said motor driving said fluid pump, said timing means including parallel spaced flexible upright elements, electrical contact points mounted in opposed relation on the inside facing surfaces of said upright elements, said electrical contacts serving to either break or complete the electrical circuit for said motor for said fluid pump, an upwardly bowed member secured to and bridging the tops of said upright elements, a rotatable circular disc having a notch in the periphery thereof mounted above said bowed member with said peripheral edge thereof contacting said bowed member, said bowed member forcing said upright elements and electrical contacts apart when contacting said peripheral edge of said disc, but allowing said upright elements and electrical contact points to close when engaged in said notch on said disc, a power means to slowly rotate said disc, said cleanout system adapted to periodically pump out the liquid and residue from the bottom of said freezing chamber.

2. In an apparatus to manufacture frozen crystal particles having a freezing chamber provided with upwardly flared serrations along the upper inside surface, an auger rotatably disposed within said freezing chamber and provided with flight means and an annular blade flange with together with said serrations forms a constricted outlet opening, power means to rotate said auger, a means to introduce liquid to be frozen into said freezer chamber, and a refrigeration means to remove heat from said freezing chamber, the improvement comprised of a cleanout system for the freezer chamber of said apparatus comprising, a fluid pump having an inlet and an outlet, a first conduit means connected at one end to an opening in the bottom of said freezer chamber and at the other end to the inlet of said fluid pump, a second conduit open at one end connected to the outlet of said fluid pump having a portion thereof extending in an upright position, a third conduit means connected at one end to said first conduit in the intermediate portion thereof and at the other end to said second conduit in the intermediate portion thereof, a fourth conduit joined at one end to said first conduit between the junction of said first and third conduits and the end connected to said freezer chamber, said fourth conduit having a portion thereof positioned in an upright position with the opposite open top end disposed at a higher elevation than the liquid level in said freezer chamber, a motor driving said fluid pump, an electrical circuit connected to said motor adapted to provide electrical current for driving same, a timing means for intermittently actuating said driving motor for said fluid pump, said timing means including electrical contact points controlled by said timer means and adapted to break said electrical circuit supplying current to said motor driving said fluid pump, said cleanout system adapted to periodically pump out the liquid and residue from the bottom of said freezing chamber.

3. In an apparatus to manufacture frozen particles having a freezing chamber, an auger rotatably disposed within said freezing chamber and provided with flight means, power means to rotate said auger, a means to introduce liquid to be frozen into said freezing chamber, and a refrigeration means to remove heat from said freezing chamber, the improvement comprised of a cleanout system for the freezing chamber of said apparatus comprising, a fluid pump having an inlet and an outlet, a first conduit means connected at one end to an opening in the bottom of said freezing chamber and at the other end to the inlet of said fluid pump, a second conduit open at one end and connected to the outlet of said fluid pump, a third conduit means connected at one end to said first conduit in the intermediate portion thereof and at the other end to said second conduit, a fourth conduit joined at one end to said first conduit between the junction of said first and third conduits and the end connected to said freezing chamber, said fourth conduit having a portion thereof positioned in an upright position with the opposite open top end disposed at a higher elevation than the liquid level in said freezing chamber, means driving said fluid pump, timing means for intermittently actuating said driving means for said fluid pump, said cleanout system adapted to periodically pump out the liquid and residue from the bottom of said freezing chamber.

References Cited by the Examiner

UNITED STATES PATENTS

| | | | |
|---|---|---|---|
| 1,576,137 | 3/1926 | Johnson | 62—354 X |
| 1,641,429 | 9/1927 | Heyman et al. | 62—354 X |
| 2,691,275 | 10/1954 | Andrews | 62—348 X |
| 2,949,019 | 8/1960 | Roberts | 63—348 X |
| 3,021,686 | 2/1962 | Alt | 63—348 X |
| 3,159,474 | 12/1964 | Moloney | 62—123 X |

FOREIGN PATENTS 409,499   5/1934   Great Britain.

ROBERT A. O'LEARY, *Primary Examiner.*